(12) United States Patent
Folin

(10) Patent No.: US 7,175,513 B2
(45) Date of Patent: Feb. 13, 2007

(54) POWER GRINDER WITH SAFETY GUARD AND SPINDLE ARRESTING MEANS

(75) Inventor: Richard Claes Folin, Arboga (SE)

(73) Assignee: Atlas Copco Tools AB, Nacka (SE)

( * ) Notice: Subject to any disclaimer, the term of this patent is extended or adjusted under 35 U.S.C. 154(b) by 0 days.

(21) Appl. No.: 10/551,299

(22) PCT Filed: Mar. 16, 2004

(86) PCT No.: PCT/SE2004/000372

§ 371 (c)(1),
(2), (4) Date: Sep. 29, 2005

(87) PCT Pub. No.: WO2004/087377

PCT Pub. Date: Oct. 14, 2004

(65) Prior Publication Data

US 2006/0240751 A1 Oct. 26, 2006

(30) Foreign Application Priority Data

Mar. 31, 2003 (SE) .................................. 0300891

(51) Int. Cl.
*B24B 23/00* (2006.01)
(52) U.S. Cl. .................. 451/359; 451/451; 451/452; 83/546
(58) Field of Classification Search ............. 451/344, 451/353, 354, 359, 451, 452, 454; 83/546, 83/860
See application file for complete search history.

(56) References Cited

U.S. PATENT DOCUMENTS

| 4,924,635 | A | * | 5/1990 | Rudolf et al. | 451/344 |
| 5,766,062 | A | * | 6/1998 | Edling | 451/451 |
| 6,893,334 | B1 | * | 5/2005 | Stivers | 451/359 |
| 6,949,017 | B2 | * | 9/2005 | Koschel et al. | 451/358 |
| 7,063,606 | B2 | * | 6/2006 | Stierle et al. | 451/359 |
| 2006/0052041 | A1 | * | 3/2006 | Wiker | 451/451 |

* cited by examiner

*Primary Examiner*—Eileen P. Morgan
(74) *Attorney, Agent, or Firm*—Frishauf, Holtz, Goodman & Chick, P.C.

(57) ABSTRACT

A portable power grinder has a housing, a rotating output shaft with a grinding wheel mounting device, a grinding wheel safety guard adjustable between angular positions defined by apertures in the safety guard, and a manually operable safety guard arresting device engageable with an aperture. The arresting device has a lock slide movable on the housing and operable by an articulated lever connected at one end to the housing and at another end to the lock slide and being shifted by folding and unfolding, thereby moving the lock slide between a safety guard arresting position and a safety guard releasing position and locking the lock slide in the arresting position. The lock slide includes a spring exerting a force onto the safety guard in the arrested position. A lock spindle displaceably supported on the lock slide moves between a retracted safety guard locking position and an advanced position to lock the output shaft.

12 Claims, 4 Drawing Sheets

POWER GRINDER WITH SAFETY GUARD AND SPINDLE ARRESTING MEANS

This application is a U.S. National Phase Application under 35 USC 371 of International Application PCT/SE2004/000372 filed Mar. 16, 2004.

The invention relates to a power grinder having a motor driven output shaft with a grinding tool mounting device, and a grinding tool safety guard adjustably supported on the tool housing between a number of pre-selected angular positions defined by apertures in the safety guard, and a manually operable arresting device for locking the safety guard in anyone of the pre-selected positions by engaging either one of the apertures.

A power grinder of the above mentioned type is previously described in U.S. Pat. No. 5,766,062.

A problem concerned with power grinders of the above type is the generation of vibrations and an annoying noise due to rattling of the safety guard during operation of the grinder. In order to guarantee that there will always be a light fit between the safety guard and the housing to facilitate adjustment of the safety guard, there will always be a play between the safety guard and the housing, and often this play will be rather big due to a normal spreading of manufacturing tolerances on the parts involved. This means that in many cases there will be room for vibrational movements of the safety guard which causes not only a rattling noise but also undesired vibrations in the grinder housing.

The main object of the invention is to provide a power grinder with an easily adjustable safety guard, and a safety guard arresting device having a means for avoiding the above mentioned problem.

Another object of the invention is to provide a power grinder having an adjustable safety guard and a safety guard arresting device, wherein the safety guard arresting device is provided with a manually operable means for temporarily locking the output shaft of the grinder at change of grinding tool.

Further characteristics and advantages of the invention will appear from the following specification and claims.

A preferred embodiment of the invention is below described in detail with reference to the accompanying drawings.

In the drawings

Figure 1:
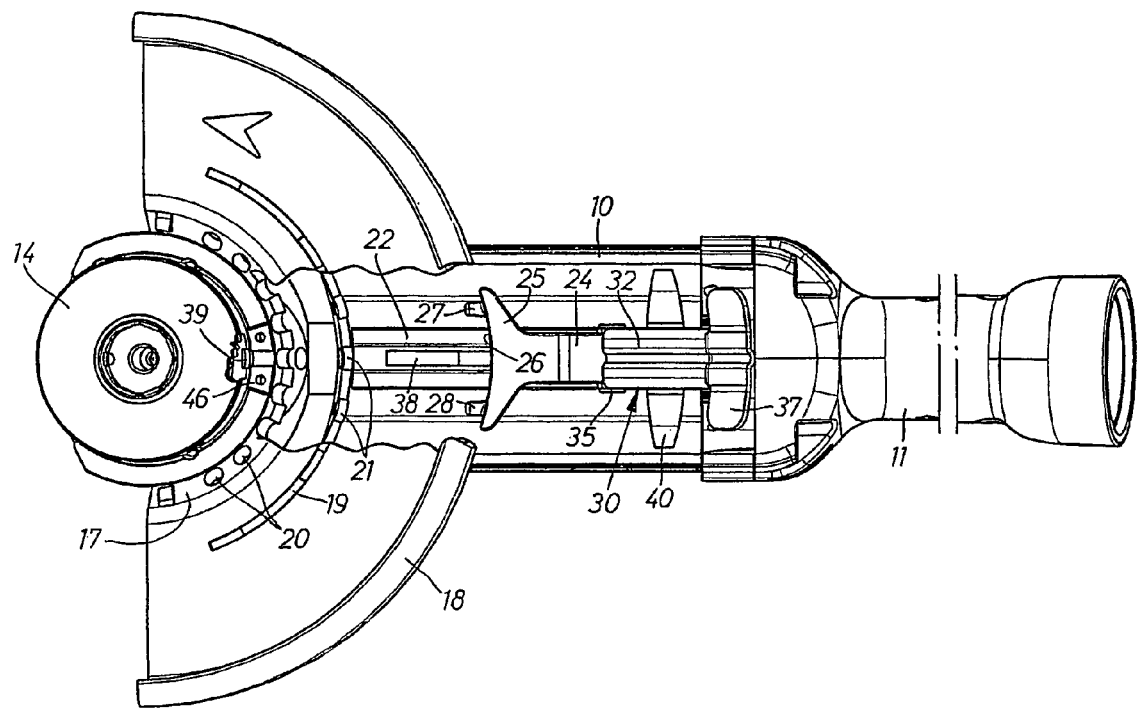
FIG. 1 shows a bottom view of a power grinder according to the invention and illustrates the arresting device in its safety guard releasing position.

The power grinder shown in the drawing figures comprises a housing 10 including a motor (not shown), a rear handle 11, a side handle 12, and an angle head 13 supporting a rotating output shaft 14. The output shaft 14 is provided with a mounting device 15 for a grinding wheel.

At the forward end of the housing 10 there is supported a grinding wheel safety guard 18 which is arranged to partly surround the grinding wheel to protect the operator and other people and equipment in the vicinity of the grinder should the grinding wheel break up and desintegrate at high speed. The safety guard 18 has an inner circular flange 17 for adjustably supporting the safety guard 18 on the angle head 13, and an outer part-circular flange 19. The outer flange 19 is provided with a row of apertures 21 for arresting the safety guard 18 in a number of pre-selected angular positions as described in further detail below. Also the inner flange 17 has a number of apertures 20 for letting through a lock spindle as described below.

On its underside, the tool housing 10 is formed with a dovetail shaped guide channel 22 extending in the longitudinal direction of the housing 10 and being directed towards the output shaft 14. In this guide channel 22 there is movably guided a lock slide 24 for movement towards and away from, respectively, the output shaft 14. For guiding of the lock slide 24 in the dovetail shaped channel 22 the lock slide 24 itself is formed with a congruent dovetail shaped guide portion 23. Moreover, the lock slide 24 is provided with a contact portion 25 with a crest formed contact surface 26 for abutting engagement with the outer flange 19 of the safety guard 18. Two studs 27,28 are secured to the contact portion 25 for engagement with two at a time of the apertures 21 in the outer flange 19 as the lock slide 24 occupies its safety guard 18 arresting position. See FIG. 1.

Figure 2:
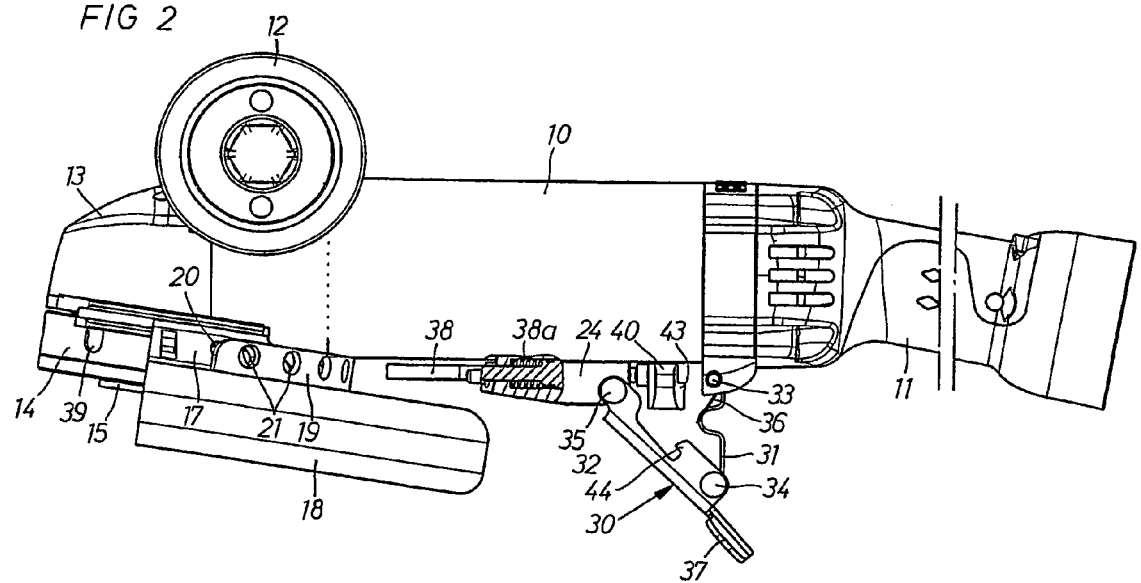
FIG. 2 shows a side view of the power grinder in FIG. 1.
Figure 4:
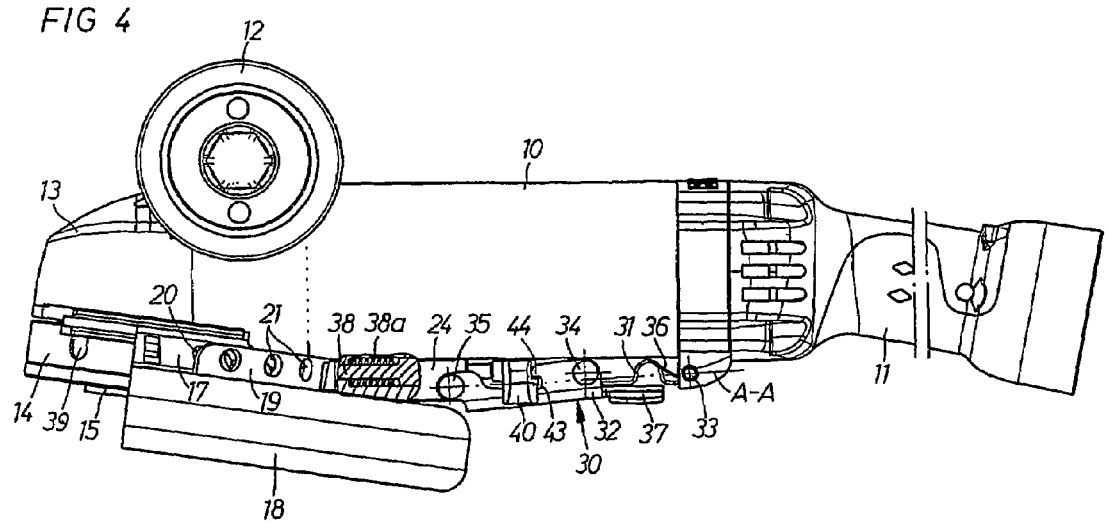
FIG. 4 shows a side view of the power grinder in FIG. 3.
Figure 6:
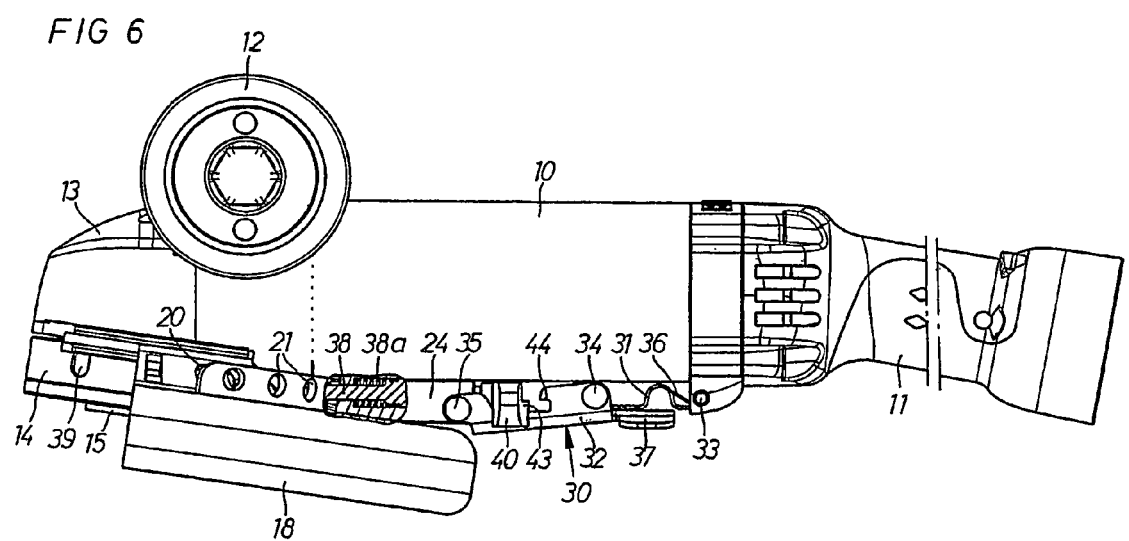
FIG. 6 shows a side view of the power grinder in FIG. 5.
Figure 7:
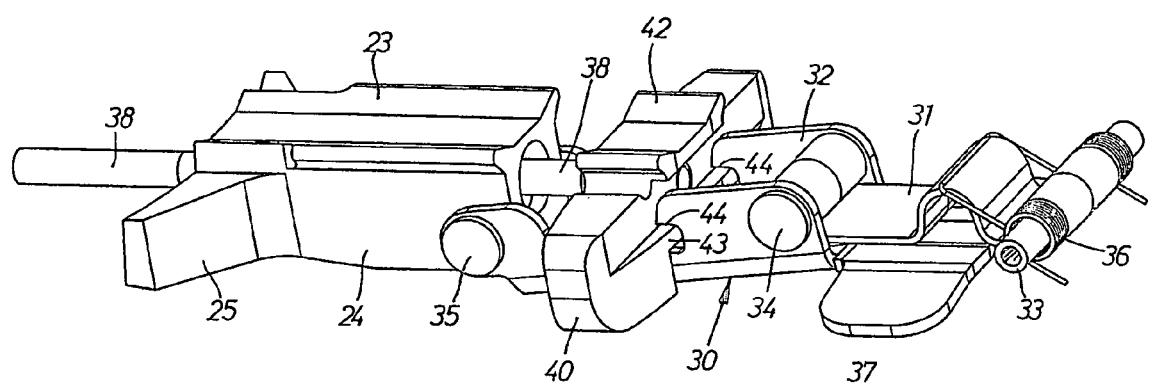
FIG. 7 shows a perspective view of the arresting device according to the invention.

The lock slide 24 is operated by an articulated lever 30 which comprises two halves 31,32 one of which, the rear half 31, is pivotally connected to the housing 10 via a pivot pin 33 and connected to the other forward half 32 via a joint pin 34. The forward lever half 32 is pivotally connected to the lock slide 24 via a pivot pin 35. The rear lever half 31 comprises a wave shaped leaf spring element, and when the lever 30 is shifted from a folded position, as illustrated in FIG. 2, to an unfolded position, as illustrated in FIGS. 4 and 6, the leaf spring element 31 is compressed longitudinally to thereby exert a pre-tensioning force on the lock slide 24. In such unfolding movement the lever 30 is forced to perform an over-centre movement, which means that the centre of the joint pin 34 moves past a straight centre line A—A extending through the centres of the pivot pins 33 and 35. See FIG. 4. The pre-tension force exerted by the compression of the spring element 31 urges the centre part of the lever 30 and the joint pin 34 against the housing 10 to thereby maintain the lock slide 24 in the safety guard abutting position. A weak torsion spring 36 is arranged around the pivot pin 33 to exert a bias force on the lever half 31 towards the folded position of the lever 30 as illustrated in FIG. 2 with the purpose to maintain the lock slide 24 in a release position and facilitate adjustment of the safety guard 18.

In order to facilitate manuevering of the lever 30, the forward lever half 32 has a rear extension 37 which is formed as a tangent to be pressed by the operator at shifting of the lever 30 toward the unfolded position.

On the lock slide 24 there is displaceably supported a lock spindle 38 which is longitudinally shiftable between a first retracted position in which it engages the apertures 21 in the outer safety guard flange 19, when the lock slide 24 occupies its active safety guard 18 arresting position (see FIG. 3) and a second extended position in which it also engages one of a number of indentations 39 in the output shaft 14 for locking the latter against rotation. A spring 38a is arranged to bias the lock spindle 38 towards the retracted position as illustrated in FIGS. 1, 2 and 3.

Figure 3:
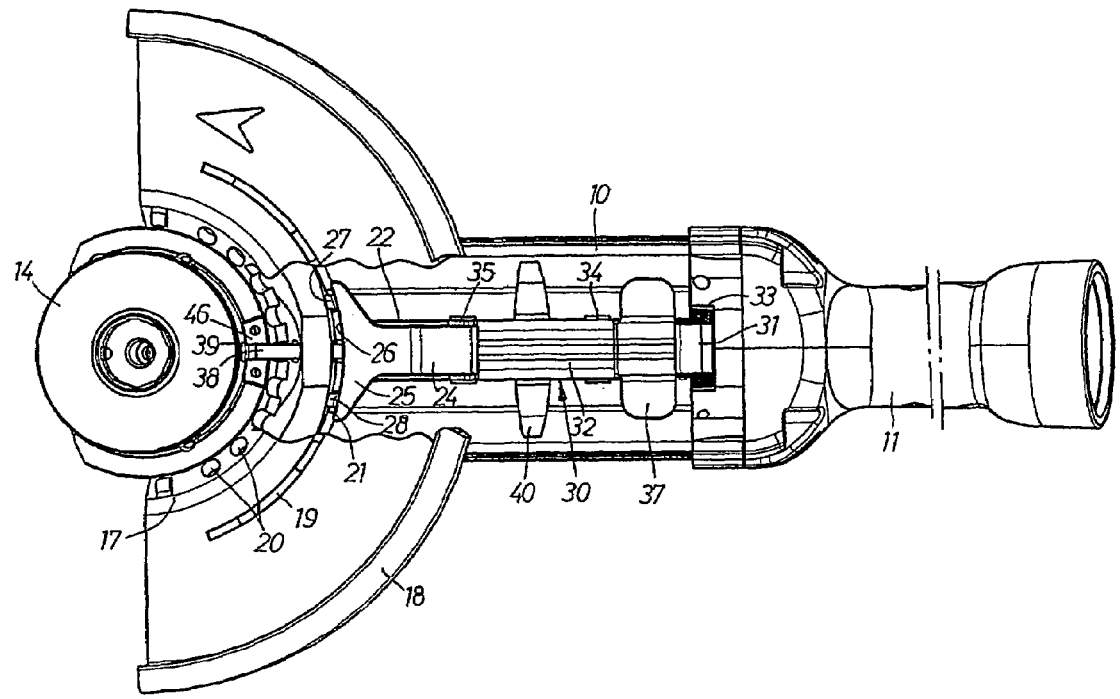
FIG. 3 shows a bottom view of the power grinder in FIG. 1 and illustrates the arresting device in a safety guard arresting position.
Figure 5:
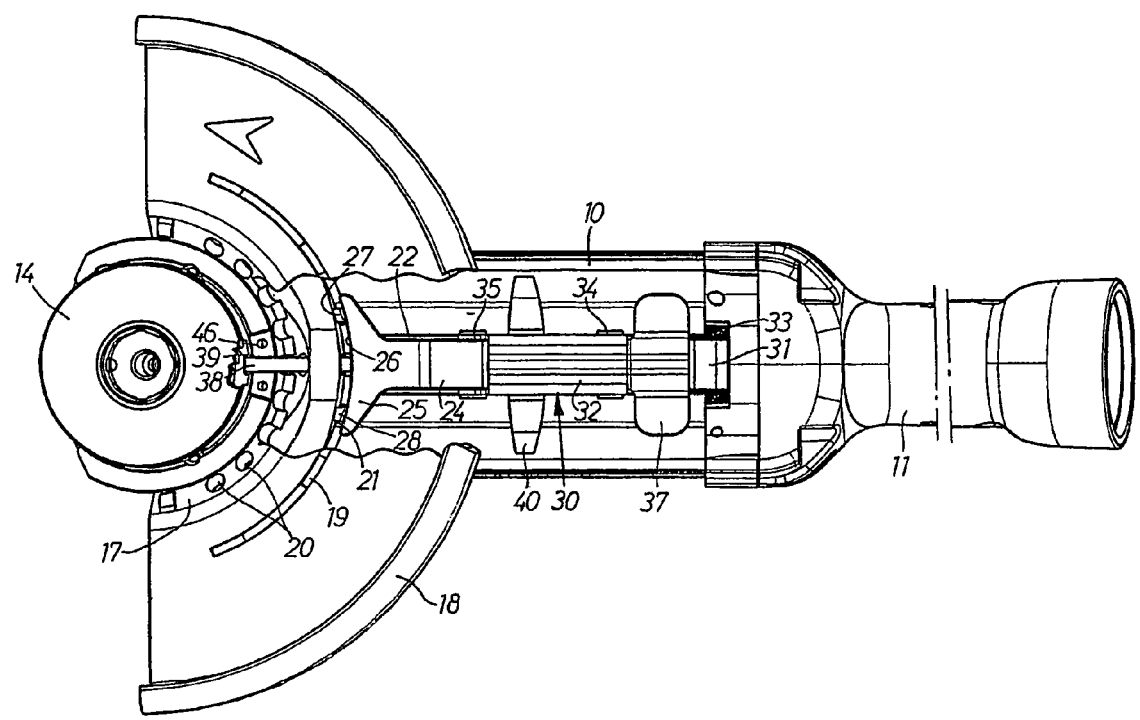
FIG. 5 shows a bottom view of the power grinder in FIG. 1 and illustrates the arresting device in a safety guard arresting position as well as in an output shaft locking position.

At its rear end, the lock spindle 38 is provided with a maneuver head 40 by which the lock spindle 38 is manually shiftable between its first retracted position as in FIGS. 1, 2 and 3 and its second extended position as in FIGS. 5 and 6.

In the same way as the lock slide 24, the maneuver head 40 is formed with a dovetail shaped guide portion 42 for sliding engagement with the channel 22 in the housing 10. The head 41 is formed with a rear transverse shoulder 43, and the lever half 32 has hook like edges 44 for co-operation with the shoulder 43 as the lever 30 occupies its unfolded position and the lock spindle 38 occupies its retracted position. By this co-operation the lever 30 is locked against accidental shifting towards its folded safety guard 18 releasing position.

A support member 46 is secured to the housing 10 adjacent the output shaft 14 and is provided with a non-illustrated through opening for guidingly receiving the forward end of the lock spindle 38 in the arresting position of the lock slide 24. The support member 46 is intended to transfer side forces to which the lock spindle 38 is subjected primarily at the output shaft 14 locking position as illustrated in FIGS. 5 and 6.

The different operating positions of the safety guard arresting device are illustrated in the drawing figures to which is referred in connection with the following description. As an example, it is assumed that the arresting device occupies its safety guard releasing position as illustrated in FIGS. 1 and 2. In this position the articulated lever 30 occupies its folded position, and the lock slide 24 is withdrawn from its co-operation with the safety guard flange 19, i.e. the contact portion 25 as well as the studs 27, 28 are disengaged from the flange 19, and the lock spindle 38 is withdrawn from the apertures 21 in the flange 19. The lever 30 is maintained in this folded position by the torsion spring 36.

When the safety guard 18 has been put in a desired angular position relative to the angle head 13, the lever 30 is shifted by means of the tangent 37 from its folded position (see FIGS. 1 and 2) to its unfolded position (see FIGS. 3 and 4), thereby shifting the lock slide 24 together with the lock spindle 38 into arresting engagement with the outer flange 19 and the apertures 21. In this arresting position, the contact portion 25 abuts via its contact surface 26 against the flange 19, and the studs 27,28 engage two of the apertures 21 in the flange 19. The lock spindle 38 penetrates through the apertures 21 in the flange 19 and extends via the apertures 20 in the inner flange 17 into the support member 46. In this position of the arresting device not only a positive locking engagement is obtained by the lock slide 24 and the lock spindle 38 visavi the flange apertures 21, but a radial tension force is applied on the flange 19 to prevent the safety guard 18 from rattling and vibrating during operation of the grinder.

The lever 30 is positively locked in its unfolded position by a latching co-operation between the hook like edges 44 on the forward lever half 32 and the shoulder 43 on the maneuver head 40. This locking action is maintained as long as the lock spindle 38 and the maneuver head 40 remain in their retracted positions.

As the centre of the joint pin 34 passes the straight line A—A through the centres of the pivot pins 33 and 35 the leaf spring element forming the rear lever half 31 is longitudinally compressed, and when having passed the over-centre point the leaf spring element 31 is able to expand to some extent but exerts a longitudinal tension force on the lever 30 such that the centre part with the joint pin 34 is forced against the housing 10, against the action of the rather weak torsion spring 36. By this over-centre movement, the lever 30 forms an endwise support of the lock slide 24, and due to the action of the spring element 31 there is maintained an abutment force between the contact portion 25 and the flange 19. The grinder is now ready for operation.

When the grinding wheel attached to the output shaft 14 has to be exchanged for another one, the motor is stopped and the lock spindle 38 is displaced forwards by means of the maneuver head 40 such that the forward end of the lock spindle 38 engages one of the indentations 39 in the output shaft 14. Thereby, the output shaft 14 is locked against rotation and the grinding wheel mounting device could be loosened and re-tightened as the grinding wheel is exchanged. See FIGS. 5 and 6.

As the lock spindle 38 and the maneuver head 40 are now displaced forwards, the locking engagement between the hook like edges 44 on the forward lever half 32 and the shoulder 43 on the maneuver head 40 is broken which means that the lever 30 may be shifted to its folded release position for enabling adjustment of the safety guard position. See FIGS. 1 and 2.

The invention claimed is:

1. A portable power grinder comprising a housing, a rotating output shaft with a grinding wheel mounting device, a grinding wheel safety guard supported on the housing and adjustable between a number of pre-selected angular positions defined by a row of apertures in the safety guard, and a manually operable arresting device for locking the safety guard in any one of said pre-selected positions by engaging one of said apertures, wherein the arresting device comprises:

a lock slide movably supported on the housing, an articulated lever having one end connected to said lock slide and an opposite end connected to the housing and arranged to move by folding and unfolding, respectively, said lock slide between a safety guard releasing position and a safety guard arresting position, said lever being arranged to be shifted between its unfolded position and its folded position via an over-center movement, and to positively arrest said lock slide in said safety guard arresting position by supporting in its unfolded position said lock slide relative to the housing, and a spring arranged to retain said lever firmly against the housing in said unfolded position.

2. A power grinder according to claim 1, wherein said lock slide comprises:

a lock spindle protruding in the movement direction of said lock slide for selectively engaging any one of said apertures in the safety guard, and a contact portion for abutting against a contact surface of the safety guard, said spring being arranged to act substantially in the longitudinal direction of said lever in said unfolded position state, thereby exerting a biasing force on said lock slide for obtaining a contact pressure between said contact portion and said contact surface of the safety guard and for maintaining said lock spindle in its engagement with one of said apertures.

3. A power grinder according to claim 1, wherein:

the output shaft is provided with at least one indentation, and said lock spindle is displaceably guided on said lock slide for movement between a first position where it engages said apertures in said safety guard only, and a second extended position where it also engages said at least one indentation on said output shaft to thereby lock said output shaft against rotation at change of grinding tool, a bias spring is arranged to bias said lock spindle toward said first position, and said lock spindle is provided with a head for manual shifting of said lock spindle from said first position to said second extended position.

4. A power grinder according to claim 2, wherein:

the output shaft is provided with at least one indentation, and said lock spindle is displaceably guided on said lock slide for movement between a first position where it engages said apertures in said safety guard only, and a second extended position where it also engages said at least one indentation on said output shaft to thereby lock said output shaft against rotation at change of grinding tool, a bias spring is arranged to bias said lock spindle toward said first position, and said lock spindle is provided with a head for manual shifting of said lock spindle from said first position to said second extended position.

5. A power grinder according to claim 1, wherein said spring comprises a leaf spring forming half of said articulated lever.

6. A power grinder according to claim 2, wherein said spring comprises a leaf spring forming half of said articulated lever.

7. A power grinder according to claim 3, wherein said spring comprises a leaf spring forming half of said articulated lever.

8. A power grinder according to claim 4, wherein said spring comprises a leaf spring forming half of said articulated lever.

9. A power grinder according to claims 2, wherein said contact portion comprises at least one stud element arranged to engage at least one of said apertures in the safety guard arresting position of said lock slide.

10. A power grinder according to claims 4, wherein said contact portion comprises at least one stud element arranged to engage at least one of said apertures in the safety guard arresting position of said lock slide.

11. A power grinder according to claim 10, wherein said spring comprises a leaf spring forming half of said articulated lever.

12. A power grinder according to claim 9, wherein said spring comprises a leaf spring forming half of said articulated lever.

* * * * *